UNITED STATES PATENT OFFICE.

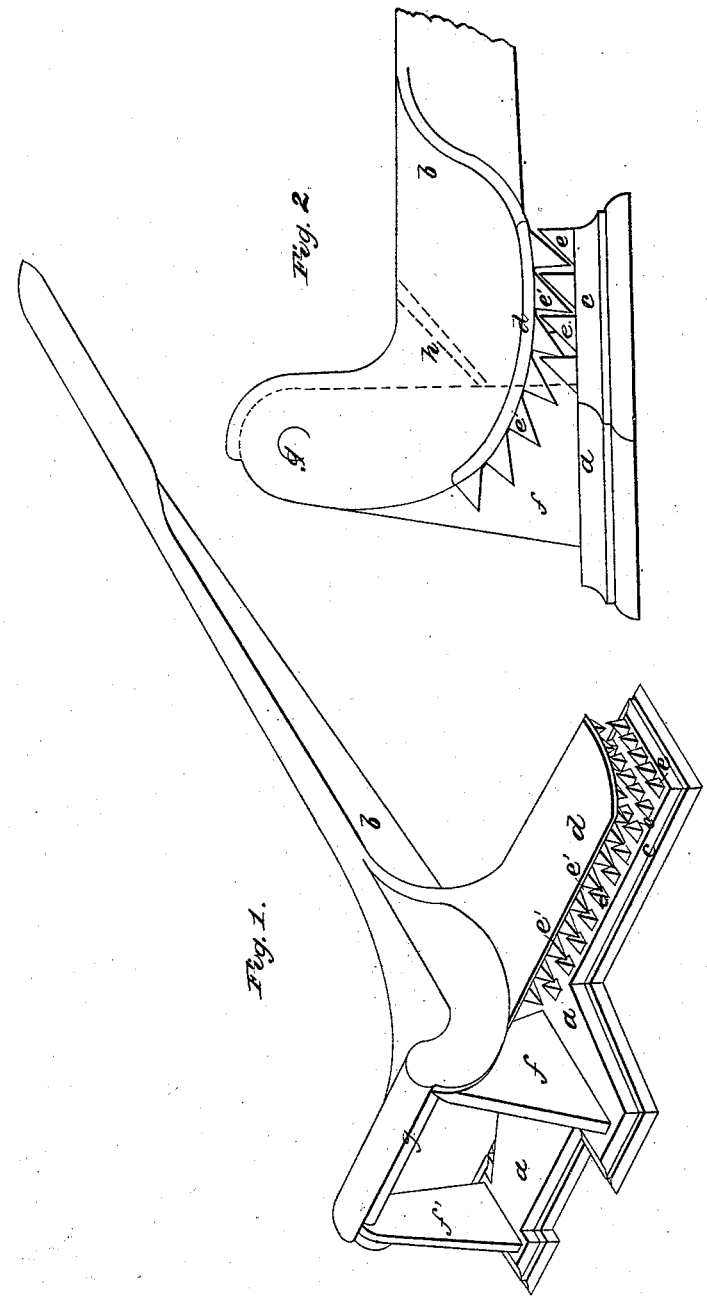

T. W. MOORE, OF PLATTSBURG, NEW YORK, ASSIGNOR TO ELLIOTT & MOORE, OF SAME PLACE.

MACHINE FOR MAKING BEEF AND OTHER STEAKS TENDER.

Specification of Letters Patent No. 21,108, dated August 3, 1858.

*To all whom it may concern:*

Be it known that I, THOS. W. MOORE, of the town of Plattsburg, county of Clinton, and State of New York, have invented a new and Improved Machine for Rendering Beef and other Steaks Tender; and I do hereby declare that the following is a full and exact description thereof, reference being had to the accompanying drawings and the letters of reference marked thereon, the same letters indicating the same parts in each figure.

The nature of my invention consists in the employment of a pair of strong iron jaws filled with pointed teeth and operated by means of a lever in such a manner that the meat is pierced by the teeth of both jaws and by the peculiar motion of one jaw in relation to the other, the meat is torn without being crushed.

To enable others skilled in the art to make and use my invention, I will proceed to describe its construction and operation.

Figure 1 is an isometrical drawing of my beef steak tenderer. Fig. 2 is an elevation of the same showing the curved form of the upper jaw, and the position of the joint in relation to the two jaws.

$a, a$, is the frame which is fastened temporarily to a table while in use; $b$, lever; $c$ projection of the frame forming the lower jaw; $d$, upper jaw attached to the lever; $e, e$, teeth of the lower jaw; $e', e'$, teeth of the upper jaw; $f$ and $f'$ perpendicular portions of the frame or support of joint $g$; $h$ stop behind and attached to lever $b$, (Fig. 2) which comes in contact with upright $f$, and prevents the points of the teeth from being injured by striking the opposite jaw.

In use, the lever is raised and the steak placed between the jaws, which are caused to approach each other by means of the lever $b$, owing to the position in which joint $g$ is arranged in relation to the jaws. Jaw $d$, approaches jaw $c$ by a combined lateral and downward motion. The object and effect of this motion in jaw $d$ is to tear the meat as far as may be without separating it, and without crushing or squeezing it. When the lever is raised the steak should be drawn along toward the handle, and when the jaws have passed entirely over the steak in one direction, it should be put in again and the jaws passed over it in a direction at right angles to the first. In this way a tough steak may be made almost equal in quality to one naturally tender. To produce this peculiar motion of the upper jaw in relation to the lower one the joint should be placed as seen in Fig. 2, so that the upper jaw will approach the lower one in a direction about forty degrees from a perpendicular.

The object of giving to jaw $d$ the scroll or curved form around center $g$, is so that that part of the upper jaw which is acting upon the steak, shall always be parallel or nearly so to the lower jaw, and also that those teeth in the upper jaw which are acting upon the steak shall always be so acting at the same or nearly the same angle whether the steak be thick or thin.

Having thus described my invention, what I claim and wish to have secured to me by Letters Patent is,

The combination of joint $g$, lever $b$, and the jaws $c$ and $d$, when these devices are so arranged that the jaws operate in relation to each other, substantially as, and for the purpose, specified.

THOS. W. MOORE.

Witnesses:
 GEORGE MOORE,
 E. B. PIERCE.